US012241599B2

(12) United States Patent
Wang

(10) Patent No.: US 12,241,599 B2
(45) Date of Patent: *Mar. 4, 2025

(54) LAMP PANEL PLUGGED TYPE LED LAMP BULB

(71) Applicant: DONGGUAN HUIHUAN LIGHTING CO., LTD, Dongguan (CN)

(72) Inventor: Song Wang, Chengdu (CN)

(73) Assignee: DONGGUAN HUIHUAN LIGHTING CO., LTD, Dongguan (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/792,647

(22) Filed: Aug. 2, 2024

(65) Prior Publication Data

US 2024/0392933 A1 Nov. 28, 2024

(30) Foreign Application Priority Data

Jul. 10, 2024 (CN) ......................... 202421628673.7

(51) Int. Cl.

| | |
|---|---|
| ***F21K 9/237*** | (2016.01) |
| ***F21K 9/232*** | (2016.01) |
| ***F21Y 113/00*** | (2016.01) |
| ***F21Y 115/10*** | (2016.01) |

(52) U.S. Cl.

CPC .............. *F21K 9/237* (2016.08); *F21K 9/232* (2016.08); *F21Y 2113/00* (2013.01); *F21Y 2115/10* (2016.08)

(58) Field of Classification Search

CPC ....... F21K 9/237; F21K 9/232; F21Y 2115/10

See application file for complete search history.

(56) References Cited

U.S. PATENT DOCUMENTS

| | | | | |
|---|---|---|---|---|
| 10,718,471 | B1 * | 7/2020 | Wu | F21K 9/238 |
| 2011/0141748 | A1 * | 6/2011 | Lee | F21K 9/232 362/363 |
| 2011/0163675 | A1 | 7/2011 | Lin et al. | |
| 2012/0153823 | A1 | 6/2012 | Lee | |
| 2019/0170304 | A1 | 6/2019 | Jiang | |

* cited by examiner

*Primary Examiner* — Karabi Guharay

(74) *Attorney, Agent, or Firm* — Hemisphere Law, PLLC; Zhigang Ma

(57) ABSTRACT

The present disclosure relates to the technical field of lamp bulbs, and discloses a lamp panel plugged type light-emitting diode (LED) lamp bulb, including a lamp holder and a lamp bulb shell fixedly connected to the lamp holder, and further including an insulation fixed seat and a lamp panel type light source assembly for vertical mounting; the insulation fixed seat is arranged at an opening portion of the lamp bulb shell; the insulation fixed seat at least includes an assembling portion and a plugging portion configured to mount the lamp panel type light source assembly; the plugging portion is provided with a plugging slot; at least two conductive contacts a are provided on an inner side of the plugging slot; one conductive contact a is electrically connected to a positive electrode of the lamp holder.

10 Claims, 8 Drawing Sheets

LAMP PANEL PLUGGED TYPE LED LAMP BULB

TECHNICAL FIELD

The present disclosure relates to the technical field of lamp bulbs, and in particular, to a lamp panel plugged type light-emitting diode (LED) lamp bulb.

BACKGROUND

Lamp bulbs are indispensable lighting tools in daily work and production. With the progress of the society, the lamp bulbs have evolved from initially providing only a lighting function to now having uses such as “beautifying and decorating the environment”.

Chinese patent No. CN202022927735.2, previously applied by the inventor, discloses a lamp bulb wick structure and a lamp bulb, including a lamp holder, a lamp bulb shell, and a lamp bulb wick. The lamp bulb wick includes a plastic seat and at least one resistor a. A first metal supporting wire passes through a first clamping seat to a first guide hole, and the resistor a is clamped and fixed in the first clamping seat; and the first metal supporting wire extends outwards to be electrically connected to a light bar. The existing lamp bulbs have the same structure as the lamp bulb structure disclosed above. Two ends of the light bar form an electrical circuit by being welded with a metal wire. However, this lamp bulb structure needs to be welded twice in the forming process, and the light bar needs to be positioned and welded, so that the requirement for the production process is high. Furthermore, the time for forming a single complete lamp bulb needs to be further reduced. In view of this, the inventor has made a new invention.

SUMMARY

To overcome the shortcomings in the prior art, the present disclosure aims to provide a lamp panel plugged type LED lamp bulb, which has the characteristic of low cost.

To achieve the above objectives, the present disclosure provides a lamp panel plugged type LED lamp bulb, including a lamp holder and a lamp bulb shell fixedly connected to the lamp holder, and further including an insulation fixed seat and a lamp panel type light source assembly for vertical mounting; the insulation fixed seat is arranged at an opening portion of the lamp bulb shell; the insulation fixed seat at least includes an assembling portion and a plugging portion configured to mount the lamp panel type light source assembly; the plugging portion is provided with a plugging slot; at least two conductive contacts a are provided on an inner side of the plugging slot; one conductive contact a is electrically connected to a positive electrode of the lamp holder; the other conductive contact a is electrically connected to a negative electrode of the lamp holder; the lamp panel type light source assembly at least includes a base plate and LEDs which are arranged along at least two opposite surfaces of the base plate and are electrically connected; the base plate is provided with two conductive contacts b; one end of the base plate is plugged into the plugging slot to make the conductive contacts b communicate with the conductive contacts a; and the other end of the base plate extends into the lamp bulb shell.

Preferably, one conductive contact a is electrically connected to the positive electrode of the lamp holder through a first conductive wire, and the other conductive contact a is electrically connected to the negative electrode of the lamp holder through a second conductive wire; the insulation fixed seat is provided with at least two wire holes; one end of the first conductive wire and one end of the second conductive wire respectively extend at least into the plugging slot through the wire holes.

Preferably, the first conductive wire and the second conductive wire both extend out of the plugging slot and form a bent portion; and the conductive contacts a are a portion of the first conductive wire and a portion of the second conductive wire.

Preferably, the conductive contacts a are conductive elastic sheets embedded in the plugging slot; and the first conductive wire and the second conductive wire are respectively electrically connected to the conductive elastic sheets.

Preferably, a partition plate is further arranged in the plugging slot, and the base plate is provided with a socket that cooperates with the partition plate.

Preferably, the assembling portion is formed by a flexible glue material; and the plugging portion is formed by a hard colloid material.

Preferably, an assembling slot configured to plug and assemble the plugging portion is provided at a top end of the assembling portion.

Preferably, a top end of the assembling portion upwards extends to form a protruding portion; and a mounting slot configured to accommodate the protruding portion is provided at a bottom end of the plugging portion.

Preferably, the protruding portion is at least provided with two positioning holes; two positioning columns are at least arranged in the mounting slot; and the positioning columns are plugged into the positioning holes.

Preferably, the base plate is a T-shaped thin plate, including an insertion portion and a light source portion; a width of the insertion portion is greater than a width of the light source portion; and the conductive contacts b are long-strip blocks and are arranged on a surface of the insertion portion.

Beneficial effects: Compared with the prior art, the present disclosure discloses the lamp panel plugged type LED lamp bulb, which has the following advantages: 1. The wick structure of the existing lamp bulb is improved from a welded type wick into a lamp panel plugged type wick, which significantly simplifies the forming process of the lamp bulb and reduces the forming cost of the lamp bulb. 2. The wick assembling efficiency is higher, and the time is shorter. 3. The insulation fixed seat can be formed by a flexible glue material and a hard colloid material, so that the lamp bulb achieves good conductive contact and has high waterproof performance.

Figure 1:
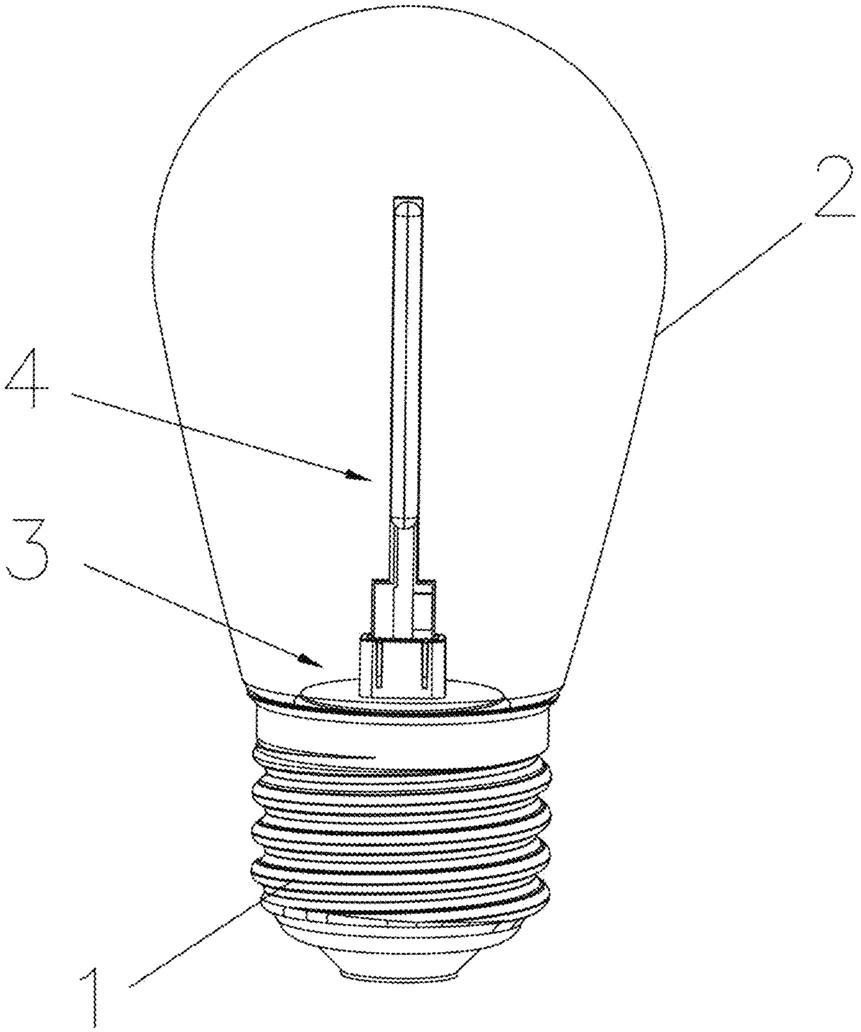
FIG. 1 is a schematic diagram of an entire structure of the present disclosure.
Figure 2:
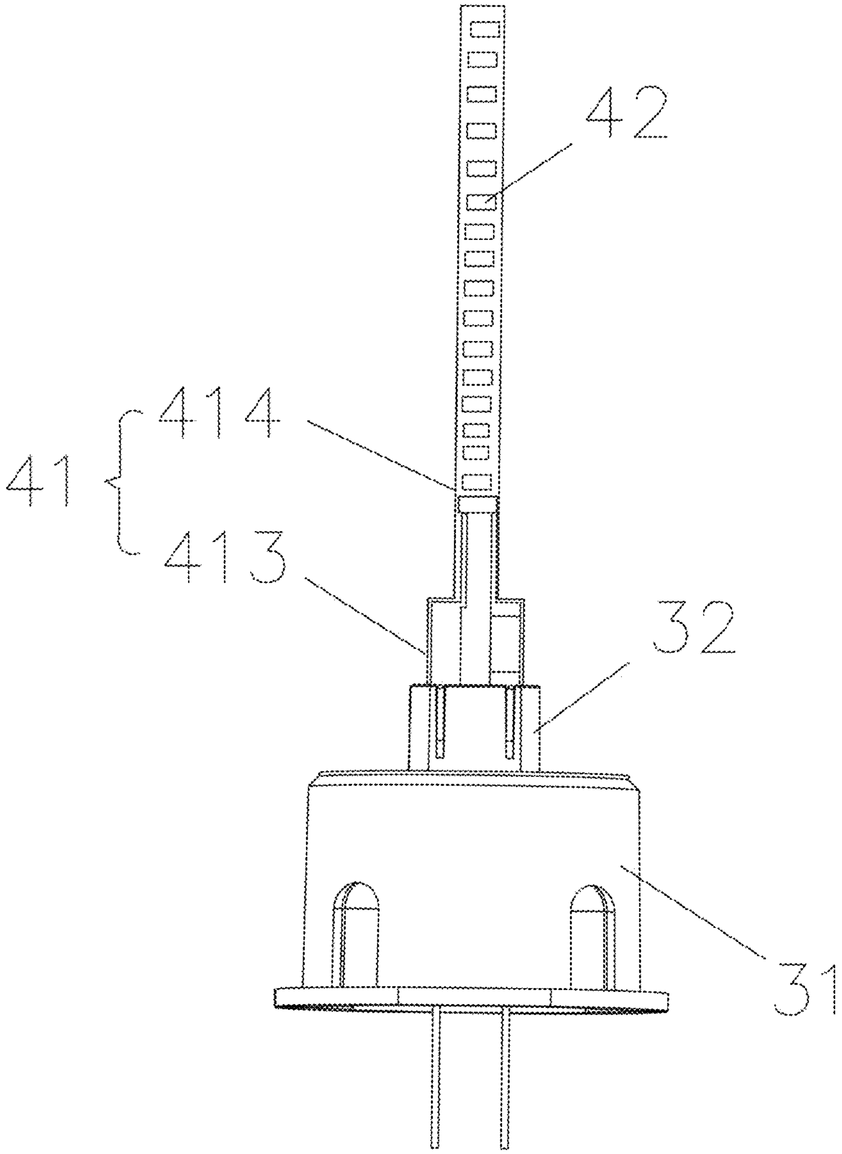
FIG. 2 is a schematic structural diagram of a wick of the present disclosure.

Reference numerals include:

1: lamp holder; 2: lamp bulb shell; 3: insulation fixed seat; 31: assembling portion; 311: assembling slot; 312: protruding portion; 313: positioning hole; 32: plugging portion; 321: plugging slot; 322: conductive contact a; 323: conductive elastic sheet; 324: partition plate; 325: mounting slot; 326: positioning column; 327: accommodating slot; 33: wire hole; 4: lamp panel type light source assembly; 41: base plate; 411: conductive contact b; 412: socket; 413: insertion portion; 414: light source portion; 42: LED; 43: fluorescent glue layer; 5: first conductive wire; 51: bent portion; 6: second conductive wire; 7: resistor; and 10: bottom plate for blocking.

DETAILED DESCRIPTION OF THE EMBODIMENTS

The present disclosure will be explained below in conjunction with the accompanying drawings 1 to 8.

The present disclosure provides a lamp panel plugged type LED lamp bulb, including a lamp holder 1 and a lamp bulb shell 2 fixedly connected to the lamp holder 1, and further including an insulation fixed seat 3 and a lamp panel type light source assembly 4 for vertical mounting; the insulation fixed seat 3 is arranged at an opening portion of the lamp bulb shell 2; the insulation fixed seat 3 at least includes an assembling portion 31 that is closely fitted and assembled with the opening portion of the lamp bulb shell 2 and a plugging portion 32 configured to mount the lamp panel type light source assembly 4; the plugging portion 32 is provided with a plugging slot 321; at least two conductive contacts a 322 are provided on an inner side of the plugging slot 321; one conductive contact a 322 is electrically connected to a positive electrode of the lamp holder 1; the other conductive contact a 322 is electrically connected to a negative electrode of the lamp holder 1; the lamp panel type light source assembly 4 at least includes a base plate 41 and LEDs 42 which are arranged along at least two opposite surfaces of the base plate 41 and are electrically connected; a circuit is deployed on the base plate 41; the LEDs 42 are electrically connected to the circuit, and outer surfaces of the LEDs 42 are coated with a fluorescent glue layer 43; the base plate 41 is provided with two conductive contacts b 411; one end of the base plate 41 is plugged into the plugging slot 321 to make the conductive contacts b 411 communicate with the conductive contacts a 322; and the other end of the base plate 41 extends into the lamp bulb shell 2.

The present disclosure improves the wick structure of the existing lamp bulb from the existing welded type wick structure into a lamp panel plugged type wick structure. The insulation fixed seat 3 is electrically connected to a lamp panel through the conductive contacts a 322 and the conductive contacts b 411, so that two ends of a light bar can be electrically connected to a metal wire without a welding process. This significantly simplifies the forming process of the lamp bulb, shortens the overall forming time of the lamp bulb, and greatly reduces the forming cost of the lamp bulb. Secondly, after a lamp panel is integrated, the lamp panel is directly inserted into the plugging slot 321 to complete an entire assembling process of a wick, and the wick assembling efficiency is greatly improved.

In this technical solution, one conductive contact a 322 is electrically connected to the positive electrode of the lamp holder 1 through a first conductive wire 5, and the other conductive contact a 322 is electrically connected to the negative electrode of the lamp holder 1 through a second conductive wire 6; the insulation fixed seat 3 is provided with at least two wire holes 33; one end of the first conductive wire 5 and one end of the second conductive wire 6 respectively extend at least into the plugging slot 321 through the wire holes 33.

Figure 3:
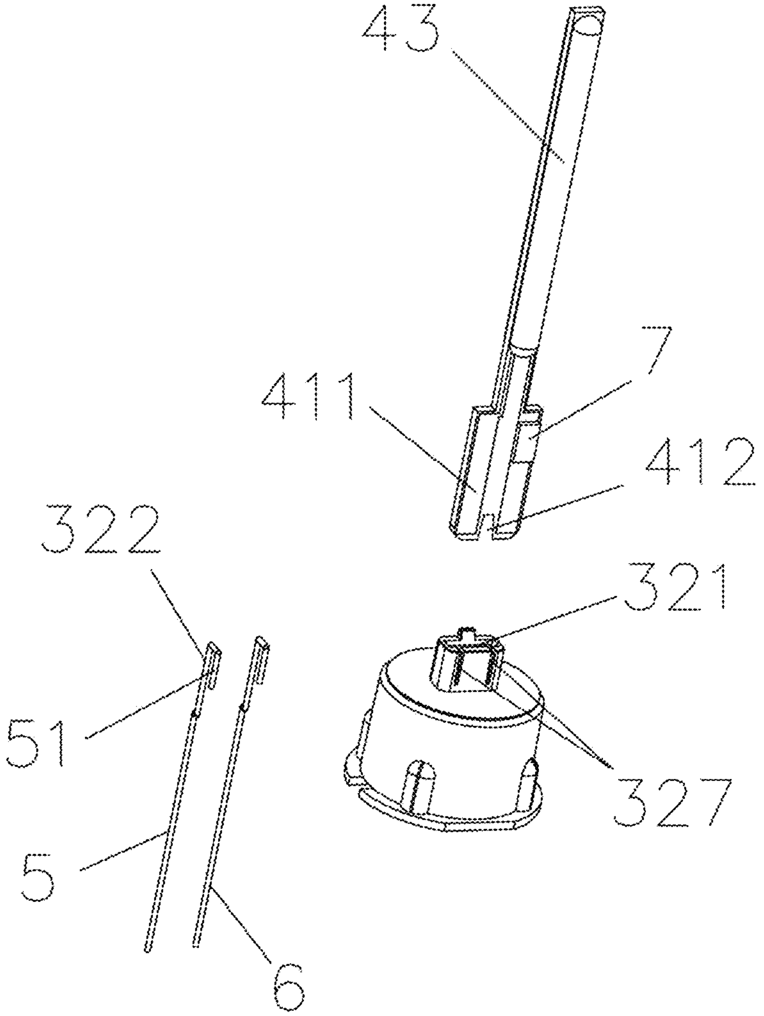
FIG. 3 is a structurally exploded diagram of a wick of the present disclosure.

Based on the above solution, as an embodiment, as shown in FIG. 3, the first conductive wire 5 and the second conductive wire 6 both extend out of the plugging slot 321 and form a bent portion 51; the bent portion 51 reversely hooks a side wall of the plugging slot 321 to position and mount the conductive wires; and at this time, the conductive contacts a 322 are a portion of the first conductive wire 5 and a portion of the second conductive wire 6. Arc-shaped bends formed by the bending of the conductive wires simultaneously endow the conductive contacts a 322 with elasticity, so that the conductive contacts a 322 and the conductive contacts b 411 can maintain a tight fit all the times and have good conductive contact.

To further conceal and better fix the conductive wires an accommodating slot 327 configured to accommodate the bent portion 51 is provided on a side wall of the plugging slot 321. The accommodating slot 327 is further conductive to making the structure more compact and avoiding end portions of the conductive wires from extending out.

Figure 4:
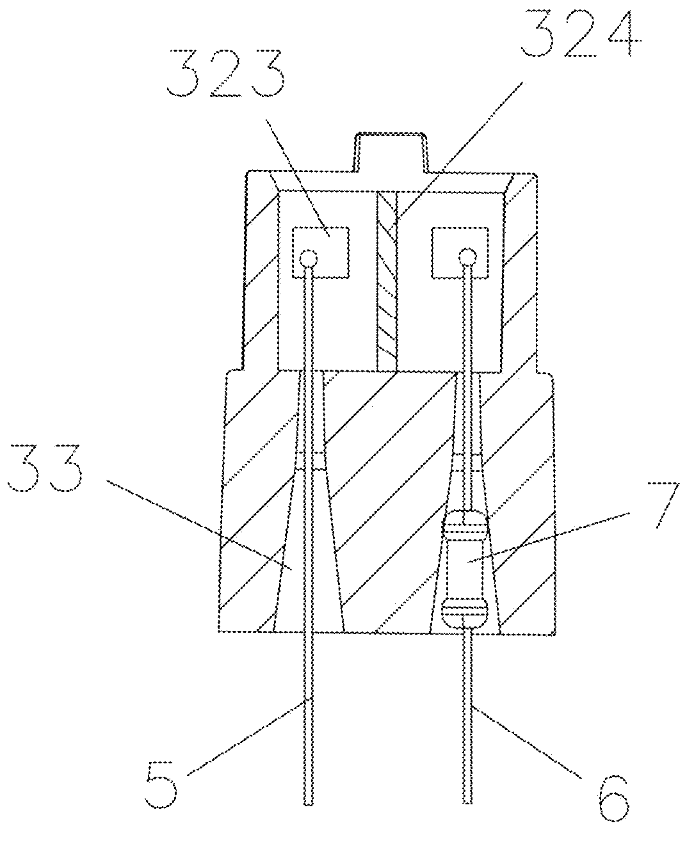
FIG. 4 is a schematic diagram of an internal structure of an insulation fixed seat of the present disclosure.

As another embodiment, as shown in FIG. 4, the conductive contacts a 322 are conductive elastic sheets 323 embedded in the plugging slot 321; and the first conductive wire 5 and the second conductive wire 6 are respectively electrically connected to the conductive elastic sheets 323. The conductive elastic sheets 323 are elastic, so that a good electrical contact can also be made between the conductive contacts a 322 and the conductive contacts b 411.

As a preference, a partition plate 324 is further arranged in the plugging slot 321. The partition plate separates the two conductive contacts a 322, the first conductive wire 5, and the second conductive wire 6 to avoid a short circuit in the lamp bulb caused by mistouch of two electrodes. Similarly, the base plate 41 is provided with a socket 412 that cooperates with the partition plate 324. Two conductive contacts b 411 are respectively located on two sides of a gap, which can prevent a short circuit in the lamp bulb too. Secondly, the lamp panel is plugged into the partition plate 324, which can form a fixed support for the base plate 41 and achieve stable mounting of the lamp panel.

As a preference, the assembling portion 31 is formed by a flexible glue material, so that the assembling portion 31 can be in tight fit with the opening portion of the lamp bulb shell 2 to seal the opening portion of the lamp bulb shell 2, and the lamp bulb has good waterproof performance. The plugging portion 32 is formed by a hard colloid material. The plugging portion 32 formed by the hard material can ensure that the conductive contacts do not shift and ensure stable contact between the conductive contacts a 322 and the conductive contacts b 411. The insulation fixed seat 3 formed by the two materials can provide good waterproof performance for the lamp bulb, and ensure good electrical contact of the lamp bulb.

Figure 5:
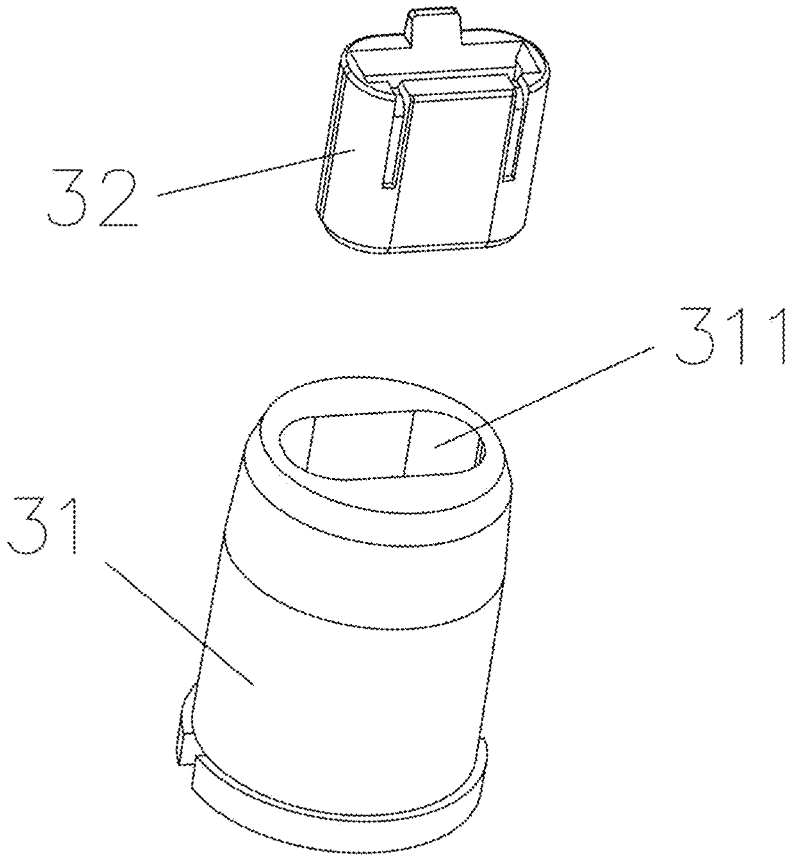
FIG. 5 is a schematic structural diagram of a first embodiment of a waterproof insulation fixed seat of the present disclosure.

As an embodiment, as shown in FIG. 5, the plugging slot 321 is provided with a bottom plate 10 for blocking, and the wire holes 33 are provided on the bottom plate 10 for blocking. When the base plate 41 is mounted in the plugging slot 321, the bottom plate 10 for blocking can limit the base plate to avoid excessive plugging. An assembling slot 311 configured to plug and assemble the plugging portion 32 is provided at a top end of the assembling portion 31. At this time, the assembling portion 31 wraps around the plugging portion 32.

Figure 6:
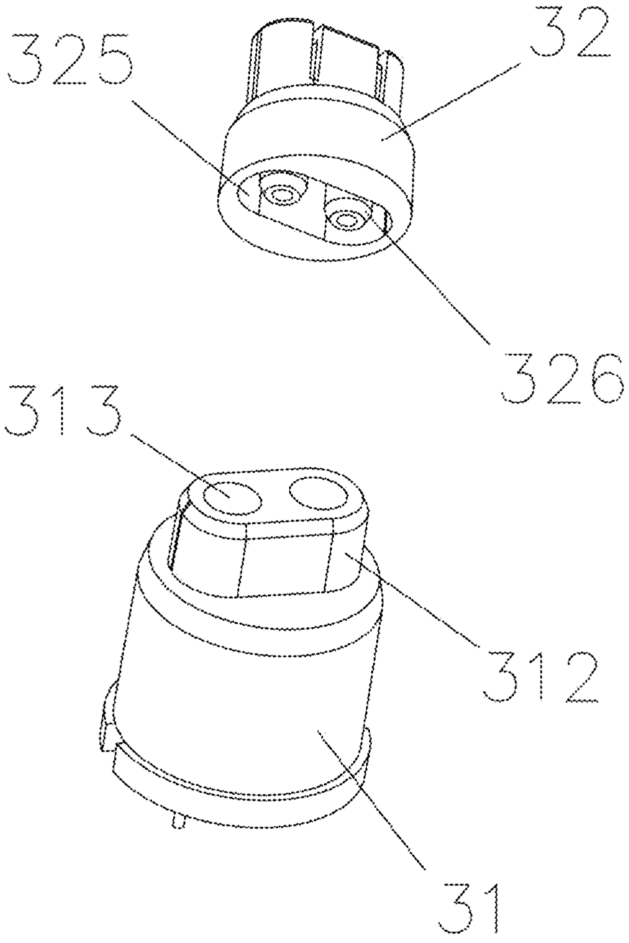
FIG. 6 is a schematic structural diagram of a second embodiment of a waterproof insulation fixed seat of the present disclosure.
Figure 7:
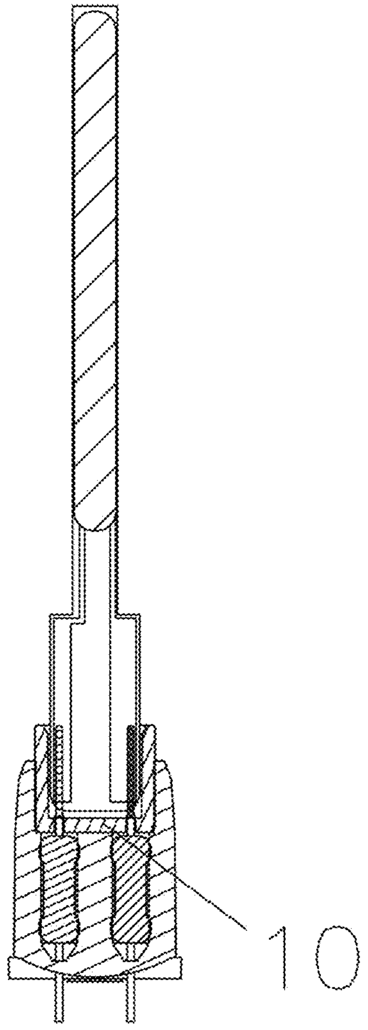
FIG. 7 is a schematic diagram of a sectional structure of a first embodiment of a waterproof insulation fixed seat of the present disclosure.
Figure 8:
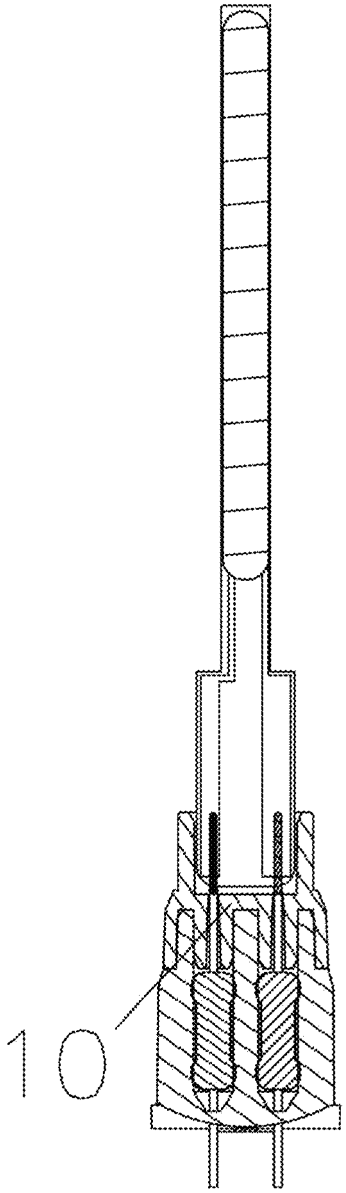
FIG. 8 is a schematic diagram of a sectional structure of a second embodiment of a waterproof insulation fixed seat of the present disclosure.

As another embodiment, as shown in FIG. 6, a top end of the assembling portion 31 upwards extends to form a protruding portion 312; and a mounting slot 325 configured to accommodate the protruding portion 312 is provided at a bottom end of the plugging portion 32. At this time, the plugging portion 32 wraps around the assembling portion 31. In this embodiment, the plugging slot 321 is also provided with a bottom plate 10 for blocking, and the wire holes 33 are provided on the bottom plate 10 for blocking. When the base plate 41 is mounted in the plugging slot 321, the bottom plate 10 for blocking can limit the base plate to avoid excessive plugging.

As a preference, the protruding portion 312 is at least provided with two positioning holes 313; two positioning columns 326 are at least arranged in the mounting slot 325; and the positioning columns 326 are plugged into the positioning holes 313. The assembling portion 31 and the plugging portion 32 are positioned and mounted through the positioning columns 326 and the positioning holes 313. This structure is added to assist in improving the production and assembling efficiency of the insulation fixed seat 3.

In this technical solution, the assembling portion 31 and the plugging portion 32 can be separately formed and then assembled into a whole, or they can be integrally injection-molded in two stages.

In this technical solution, the base plate 41 is formed by a polyvinyl chloride (PVC) material. Compared with a ceramic base plate 41, the PVC base plate 41 has better toughness, is less prone to bending and breakage, and has a longer service life. The base plate 41 is a T-shaped thin plate, including an insertion portion 413 and a light source portion 414. A width of the insertion portion 413 is greater than that of the light source portion 414, so that the base plate 41 can form a stable support for the light source portion 414 after being plugged. The conductive contacts b 411 are long-strip blocks and are arranged on a surface of the insertion portion 413. Contact areas of the long-strip block-shaped conductive contacts b 411 are larger, and the conductive contacts a 322 and the conductive contacts b 411 can be better conducted.

The present disclosure further includes at least one resistor 7. The resistor 7 is arranged on a conductive wire or is integrated on the base plate 41. When integrated on the base plate 41, the resistor has a better cost advantage and a better assembling efficiency advantage.

The above content only describes preferred embodiments of the present disclosure. A person of ordinary skill in the art can make changes to specific implementations and the application scope according to the idea of the present disclosure. The content of this specification should not be understood as a limitation on the present disclosure.

What is claimed is:

1. A lamp panel plugged type light-emitting diode (LED) lamp bulb, comprising a lamp holder (1) and a lamp bulb shell (2) fixedly connected to the lamp holder (1), and further comprising an insulation fixed seat (3) and a lamp panel type light source assembly (4) for vertical mounting;

the insulation fixed seat (3) is arranged at an opening portion of the lamp bulb shell (2); the insulation fixed seat (3) at least comprises an assembling portion (31) and a plugging portion (32) configured to mount the lamp panel type light source assembly (4); the plugging portion (32) is provided with a plugging slot (321); at least two conductive contacts a (322) are provided on an inner side of the plugging slot (321); one conductive contact a (322) is electrically connected to a positive electrode of the lamp holder (1); the other conductive contact a (322) is electrically connected to a negative electrode of the lamp holder (1);

the lamp panel type light source assembly (4) at least comprises a base plate (41) and light-emitting diodes (LEDs) (42) which are arranged along at least two opposite surfaces of the base plate (41) and are electrically connected; the base plate (41) is provided with two conductive contacts b (411); one end of the base plate (41) is plugged into the plugging slot (321) to make the conductive contacts b (411) communicate with the conductive contacts a (322); and the other end of the base plate (41) extends into the lamp bulb shell (2).

2. The lamp panel plugged type LED lamp bulb according to claim 1, wherein one conductive contact a (322) is electrically connected to the positive electrode of the lamp holder (1) through a first conductive wire (5), and the other conductive contact a (322) is electrically connected to the negative electrode of the lamp holder (1) through a second conductive wire (6); the insulation fixed seat (3) is provided with at least two wire holes (33); one end of the first conductive wire (5) and one end of the second conductive wire (6) respectively extend at least into the plugging slot (321) through the wire holes (33).

3. The lamp panel plugged type LED lamp bulb according to claim 2, wherein the first conductive wire (5) and the second conductive wire (6) both extend out of the plugging slot (321) and form a bent portion (51); and the conductive contacts a (322) are a portion of the first conductive wire (5) and a portion of the second conductive wire (6).

4. The lamp panel plugged type LED lamp bulb according to claim 2, wherein the conductive contacts a (322) are conductive elastic sheets (323) embedded in the plugging slot (321); and the first conductive wire (5) and the second conductive wire (6) are respectively electrically connected to the conductive elastic sheets (323).

5. The lamp panel plugged type LED lamp bulb according to claim 2, wherein a partition plate (324) is further arranged in the plugging slot (321), and the base plate (41) is provided with a socket (412) that cooperates with the partition plate (324).

6. The lamp panel plugged type LED lamp bulb according to claim 1, wherein the assembling portion (31) is formed by a flexible glue material; and the plugging portion (32) is formed by a hard colloid material.

7. The lamp panel plugged type LED lamp bulb according to claim 6, wherein an assembling slot (311) configured to plug and assemble the plugging portion (32) is provided at a top end of the assembling portion (31).

8. The lamp panel plugged type LED lamp bulb according to claim 6, wherein a top end of the assembling portion (31) upwards extends to form a protruding portion (312); and a mounting slot (325) configured to accommodate the protruding portion (312) is provided at a bottom end of the plugging portion (32).

9. The lamp panel plugged type LED lamp bulb according to claim 8, wherein the protruding portion (312) is at least provided with two positioning holes (313); two positioning columns (326) are at least arranged in the mounting slot (325); and the positioning columns (326) are plugged into the positioning holes (313).

10. The lamp panel plugged type LED lamp bulb according to claim 1, wherein the base plate (41) is a T-shaped thin plate, comprising an insertion portion (413) and a light source portion (414); a width of the insertion portion (413) is greater than a width of the light source portion (414); and the conductive contacts b (411) are long-strip blocks and are arranged on a surface of the insertion portion (413).

* * * * *